United States Patent
Gao et al.

(10) Patent No.: US 9,971,643 B2
(45) Date of Patent: May 15, 2018

(54) PROCESSING AN INPUT/OUTPUT OPERATION REQUEST

(71) Applicant: EMC Corporation, Hopkinton, MA (US)

(72) Inventors: Jian Gao, Beijing (CN); Geng Han, Beijing (CN); Jibing Dong, Beijing (CN); Huibing Xiao, Beijing (CN); Wenxuan Yin, Beijing (CN); Yingying Song, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days. days.

(21) Appl. No.: 14/883,082

(22) Filed: Oct. 14, 2015

(65) Prior Publication Data

US 2016/0124855 A1 May 5, 2016

(30) Foreign Application Priority Data

Oct. 20, 2014 (CN) .......................... 2014 1 0562464

(51) Int. Cl.
*G06F 3/06* (2006.01)
*G06F 11/10* (2006.01)
*G06F 12/14* (2006.01)

(52) U.S. Cl.
CPC ............ *G06F 11/10* (2013.01); *G06F 3/0619* (2013.01); *G06F 3/0659* (2013.01); *G06F 3/0689* (2013.01); *G06F 12/145* (2013.01)

(58) Field of Classification Search
CPC .... G06F 3/0622; G06F 3/0644; G06F 3/0659; G06F 3/0689; G06F 12/1416; G06F 12/145; G06F 3/0619
USPC .......................................................... 711/131
See application file for complete search history.

(56) References Cited

U.S. PATENT DOCUMENTS

| | | | | |
|---|---|---|---|---|
| 2008/0162846 A1* | 7/2008 | Kodama | ............. | G06F 11/1456 711/162 |
| 2009/0327613 A1* | 12/2009 | Nutter | ................. | G06F 12/0875 711/141 |
| 2010/0030988 A1* | 2/2010 | Takeuchi | ............... | G06F 3/0611 711/162 |
| 2010/0162244 A1* | 6/2010 | Tsai | ........................ | G06F 9/505 718/100 |
| 2012/0198471 A1* | 8/2012 | Kukanov | ................ | G06F 9/526 718/108 |
| 2013/0111136 A1* | 5/2013 | Bell, Jr. | .................. | G06F 12/08 711/122 |

(Continued)

*Primary Examiner* — Hal Schnee
(74) *Attorney, Agent, or Firm* — Krishnendu Gupta; Konrad Lee; Anne-Marie Dinius

(57) ABSTRACT

A method, computer program product, and apparatus for processing an input/output IO operation request by maintaining a first chain table and a first cache table for each of the plurality of storage array groups, the method, computer program product, and apparatus including generating a second cache table comprising a second plurality of cache slots for the cache slot in the first plurality of cache slots, corresponding to a specific storage address range for which a number of times of the IO operation requests exceeds a first predetermined threshold; and processing the IO operation request received by the first processor based at least on the first chain table and the first cache table and/or the second cache table.

20 Claims, 8 Drawing Sheets

(56) References Cited

U.S. PATENT DOCUMENTS

2015/0012704 A1* 1/2015 Watanabe ............. G06F 3/0689
                                                    711/114
2015/0106578 A1* 4/2015 Warfield ............... G06F 3/0613
                                                    711/158

* cited by examiner

PROCESSING AN INPUT/OUTPUT OPERATION REQUEST

RELATED APPLICATION

This application claims priority from Chinese Patent Application Number CN201410562464.1 filed on Oct. 20, 2014 entitled "METHOD AND APPARATUS FOR PROCESSING INPUT/OUTPUT OPERATION REQUEST" the content and teachings of which is herein incorporated by reference in its entirety.

FIELD OF THE INVENTION

Embodiments of the present disclosure generally relate to processing an input/output operation request in a storage device.

BACKGROUND OF THE INVENTION

In the field of storage, an active-active architecture comprising dual storage processors (SPs) refers to an architecture that may have simultaneously process, on two SPs, concurrent input/output (IO) operation requests to an identical RAID (Redundant Array Of Independent Disk) group or a same stripe/logical block address (LBA) area. Typically, this active-active architecture significantly may enhance performance of a storage device having dual SPs. For example, when one SP is down, the other SP that may be still running can immediately take over all logic units (LUNs) such that user data may maintain secure, reliable and accessible during a failover.

SUMMARY OF THE INVENTION

Various embodiments of the present disclosure provide a solution enabling a tradeoff between a common message infrastructure (CMI) message transmission frequency and storage occupancy.

Accordingly embodiments of the present disclosure provide a system, a computer program product and a method for processing an input/output operation request in a storage device, the storage device comprising a first processor and a second processor and further comprising a plurality of storage array groups. In one embodiment a first chain table and a first cache table for each of the plurality of storage array groups may be maintained at a first processor. In as further embodiment, a first chain table may at least hold information regarding an input/output operation request that may be permitted by the first processor with respect to a specific storage address range in a corresponding storage array group. In a further embodiment first cache table may include a first plurality of cache slots, wherein each of a first plurality of cache slots may hold a permission state of a second processor with respect to an input/output operation that may be associated with a specific storage address range in the corresponding storage array group.

In a further embodiment, a second cache table for one or more of the following one or more cache slots among the first plurality of cache slots may generate a number of times of input/output operation requests that may be to the specific storage address range corresponding to each of said one or more cache slots that may exceed a first predetermined threshold. In a further embodiment a second cache table may include a second plurality of cache slots and a size of each of the second plurality of cache slots that may be smaller than a size of each of the first plurality of cache slots. In a further embodiment, an input/output operation request received by the first processor may be processed based at least on a first chain table and a first cache table and/or the second cache table.

BRIEF DESCRIPTION OF THE ACCOMPANYING DRAWINGS

The features, advantages and other aspects of respective embodiments of the present disclosure will become more obvious through the following detailed description in conjunction with the accompanying drawings. Several embodiments of the present disclosure are illustrated by way of example rather than limiting. In the accompanying drawings, the same or similar reference numerals refer to the same or similar elements, in which.

DETAILED DESCRIPTION OF THE PREFERRED EMBODIMENTS

Figure 1:
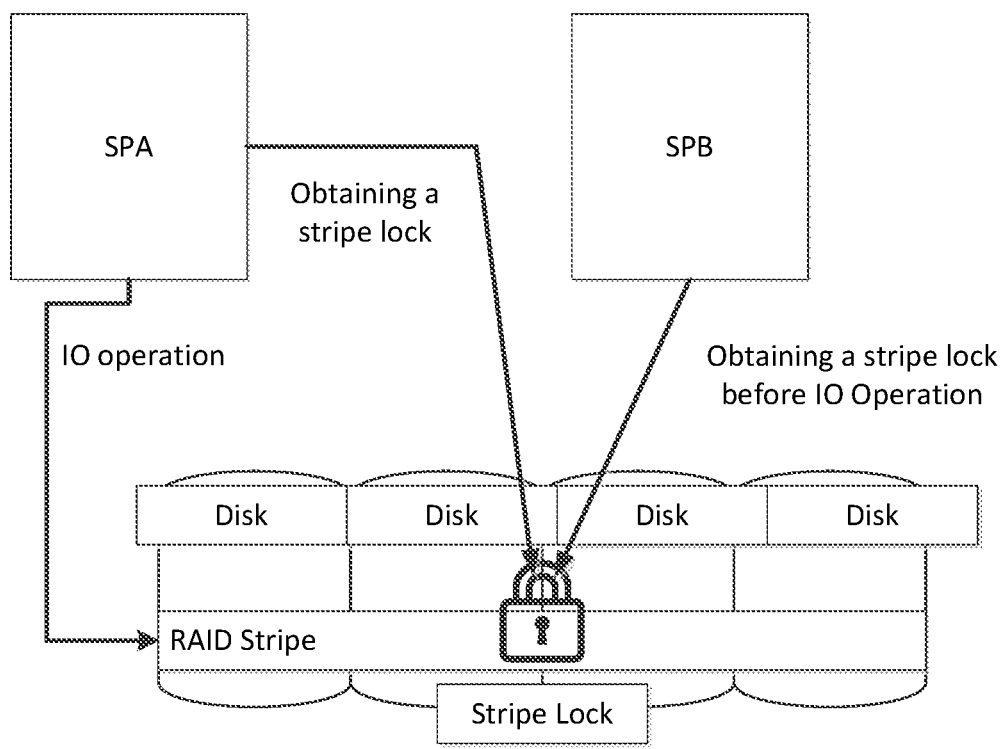
FIG. 1 shows an exemplary concept diagram of a stripe lock.

Hereinafter, various exemplary embodiments of the present disclosure will be described in detail with reference to the accompanying drawings.

It should be appreciated that these exemplary embodiments are provided only for enabling those skilled in the art to better understand and then further implement the embodiment of the present disclosure, and are not intended to limit the scope of the present disclosure in any way.

Hereinafter, reference to "one embodiment," "another embodiment" or "a preferable embodiment" indicates that the described embodiment may comprise a specific feature, structure, or characteristic, but each embodiment does not necessarily comprise the specific feature, structure or characteristic. Moreover, these terms do not necessarily refer to the same embodiment.

It should be further understood that various terms used herein are for the purpose of describing particular embodiments only and is not intended to limit the present disclosure. As used herein, the singular forms "a", "an" and "the" are intended to comprise the plural forms as well, unless the context clearly indicates otherwise. It will be further understood that the terms "comprises", "comprising", "has", "having", "contains" and/or "containing", when used herein, specify the presence of stated features, elements, and/or components etc., but do not preclude the presence or addition of one or more other features, elements, components and/or combinations thereof. The term "a plurality of" as used herein indicates "two or more." The term "and/or" as used herein may comprise any or all combinations of one or more of listed items in association. Definitions of other terms will be specifically provided in the description below.

Embodiments of the present disclosure provide a system, a computer program product and a method for processing an input/output operation request in a storage device, the storage device comprising a first processor and a second processor and further comprising a plurality of storage array groups. In one embodiment a first chain table and a first cache table for each of the plurality of storage array groups may be maintained at a first processor. In as further embodiment, a first chain table may at least hold information regarding an input/output operation request that may be permitted by the first processor with respect to a specific storage address range in a corresponding storage array group. In a further embodiment a first cache table may include a first plurality of cache slots, wherein each of a first plurality of cache slots may hold a permission state of a second processor with respect to an input/output operation that may be associated with a specific storage address range in the corresponding storage array group. In a further embodiment, a second cache table for one or more of the following one or more cache slots among the first plurality of cache slots may generate a number of times of input/output operation requests that may be to the specific storage address range corresponding to each of said one or more cache slots that may exceed a first predetermined threshold. In a further embodiment a second cache table may include a second plurality of cache slots and a size of each of the second plurality of cache slots that may be smaller than a size of each of the first plurality of cache slots. In a further embodiment, an input/output operation request received by the first processor may be processed based at least on a first chain table and a first cache table and/or the second cache table.

In some embodiments, if permission states held by a second plurality of cache slots in a second cache table may be identical states, then setting a cache slot, for which the second cache table may be generated, among a first plurality of cache slots as an identical state, and deleting a second cache table.

In some other embodiments, first, judging whether a number of times of an input/output operation requests to a storage address range corresponding to a second cache table may be lower than a second predetermined threshold, and if the number of times may be determined to be lower than a second predetermined threshold, reclaiming a second cache table.

In one embodiment there may be an apparatus for processing an input/output operation request in a storage device, In a further embodiment, a storage device may comprise a first processor and a second processor and may also comprise a plurality of storage array groups. In a further embodiment, a table maintaining unit may be configured to maintain, at a first processor, a first chain table and a first cache table for each of the plurality of storage array groups. In a further embodiment, a first chain table may at least hold information regarding an input/output operation request that may be permitted by a first processor with respect to a specific storage address range in a corresponding storage array group. In a further embodiment a first cache table may comprise a first plurality of cache slots, wherein each of a first plurality of cache slots may hold a permission state of a second processor with respect to an input/output operation that may be associated with a specific storage address range in the corresponding storage array group.

In a further embodiment, a child table generating unit may be configured to generate a second cache table respectively for one or more of the following one or more cache slots among the first plurality of cache slots. In a further embodiment, a number of times of input/output operation requests to a specific storage address range may correspond to each of said one or more cache slots that may exceed a first predetermined threshold. In a further embodiment, a second cache table may comprises a second plurality of cache slots and a size of each of a second plurality of cache slots that may be smaller than a size of each of the first plurality of cache slots.

In a further embodiment, an operation request processing unit may be configured to process an input/output operation request that may be received by a first processor based at least on a first chain table and a first cache table and/or a second cache table.

In some embodiments, the apparatus may further comprise: a child table reclaiming unit that may be configured to, if permission states held by a second plurality of cache slots in a second cache table may be identical states, set a cache slot, among a first plurality of cache slots, for which a second cache table may be generated, as an identical state, and delete a second cache table.

In some other embodiments, the apparatus may further comprise: a child table reclaiming unit that may be configured to first judge whether a number of times of input/output operation requests to a storage address range corresponding to a second cache table may be lower than a second predetermined threshold, and if the number of times may be lower than the second predetermined threshold, reclaim a second cache table.

In order to illustrate various embodiments of the present invention more clearly, structures and operations of the existing stripe lock chain table and stripe lock cache table will be introduced first.

In one embodiment, an operation of a dual SP active-active architecture may require that storage arrays of a dual SP storage device may be synchronized on the shared RAID group or RAID stripe in case any concurrent IO operations may disturb a user data. In a further embodiment, in current dual SP active-active architecture, in order to strictly control read/write operation requests from the two SPs, a concept of stripe lock (SL) may be proposed. In a further embodiment, a stripe lock may be substantially a read/write lock for a RAID stripe. In a further embodiment, a basic objective of a read/write lock may be to permit multiple read operations simultaneously on a same storage area of the RAID stripe, but may be to only permit one write operation on a same storage area at one time. In a further embodiment, for each IO operation, before being processed, a local stripe lock may have to be obtained first from a local SP (i.e. the SP receiving an IO operation request; i.e., obtaining permission for performing an IO operation from a local SP), and then a peer stripe lock may be obtained from a peer SP (that is, obtaining permission for performing an IO operation from a peer SP). In a further embodiment, a requested IO operation may only be performed after stripe locks may be obtained from a local SP and a peer SP. In a further embodiment, after an IO operation completes, the obtained corresponding stripe locks may be released. In the description below, "obtaining a stripe lock" and "obtaining permission for an IO operation" and similar expressions have the identical or like meaning.

FIG. 1 shows an exemplary concept diagram of a stripe lock. FIG. 1 shows four disk arrays which form a RAID stripe and may be concurrently read or written. As shown in FIG. 1, when a processor SPA receives an IO operation request to a certain storage address range of the shown stripe, a stripe lock for the IO operation will be obtained first from the local SPA, i.e., first obtaining permission for performing the IO operation from the SPA, and then a stripe lock for the IO operation will be obtained from the peer SPA, i.e., obtaining permission for performing the IO operation from the peer SPA, and then allowing to perform the requested IO operation on the stripe.

In one embodiment, in order to guarantee correct use of a stripe lock, there may be three rules to follow: lock obtaining requests may have to follow the reception sequence of IO operation requests; for a write operation, an exclusive lock may have to be used for protecting a storage address area to be written that may be occupied by other concurrent read operations or write operations; and for a read operation, a shared lock may be used so that other read operations may simultaneously access the same storage address area, but write operations on the storage address area may not be performed.

In one embodiment, an existing stripe lock mechanism may include two important data structures, one that may be called a stripe lock chain table and the other that may be called a stripe lock cache table (their specific structures and operations will be detailed hereafter). In a further embodiment, in a storage device that may include dual SPs, a stripe lock chain table and a stripe lock cache table may be maintained at each SP for each storage array group (e.g., a RAID group). In a further embodiment, a stripe lock chain table may record information regarding IO operation requests that may be permitted by the local SP (e.g., SPA in FIG. 1) with respect to a specific storage address area included in the storage array group, while the stripe block cache table may record a current permission state of a peer SP (e.g., SPB in FIG. 1) with respect to the IO operations on respective storage address areas that may be included in a storage array group.

In one embodiment, when an SP may receive an IO operation request to a certain storage address range of a RAID group associated therewith, the SP may be configured to first query a local stripe lock chain table stored for a RAID group to ensure that the IO operation on the storage address range may be locally permitted. In a further embodiment, if a SP does not permit the IO operation on the storage address range, the IO operation request may be placed in a waiting chain in a locally stored stripe lock chain table; otherwise, the SP may then query a stripe lock cache table stored for a RAID group to judge whether a peer SP may permit a requested IO operation on a storage address range.

In a further embodiment, a stripe lock cache table may include a plurality of cache slots, each cache slot may correspondingly representing a current permission state of a peer SP with respect to an IO operation on a specific storage address range, that may determine the granularity of a stripe lock. In a further embodiment, if a query result of the local SP on the stripe lock cache table may show/indicate non permitting of the IO operation on a specific storage address range, it may mean that a peer SP may hold a stripe lock for a specific storage address range, and then the local SP may need to send a CMI message to a peer SP over a CMI channel and may request permission for the IO operation. In a further embodiment, a CMI channel may be a cross-SP channel embedded in a storage array substrate that may be built on a PCIe link. In a further embodiment, a CMI message may need to be processed through a corresponding protocol in a CMI messaging stack.

In some embodiment, usually, a speed of transmitting a CMI message over a CMI channel may be much lower than an operation speed that may be associated within a memory of a local processor, e.g., speed of querying a locally stored stripe lock cache table. In a further embodiment, transmission of a CMI message may become a bottleneck of a current storage device that may be using a stripe lock technology, and a frequency of sending a CMI message may be mainly decided by granularity of a stripe lock cache slots, while impacts from IO mode, IO load and other factors thereon may be relatively weak.

In certain embodiments, commonly used stripe lock cache table may generally include 512 cache slots. In a further embodiment, a coarse granularity on one hand may reduce a storage budge of a storage device for the stripe lock cache table, but on the other hand may increase the odds of stripe lock collisions within a storage device. In one embodiment, the term "stripe lock collision" used herein may generally mean a collision that both a local SP and a peer SP may want to perform IO operations on a same storage address range, and IO operations may at least comprise a write operation. In a further embodiment, larger a storage address range corresponding to a stripe lock cache slot, greater may be the odds of IO operation collisions on that storage address range, which may mean that more CMI messages may need to be sent, which may deteriorate performance of a storage device. In a further embodiment, if a storage address range corresponding to a stripe lock cache slot may be determined to be relatively small, then on one hand, the odds of IO operation collisions on that storage address range may be lowered, but on the other hand, more storage space may be needed to hold these stripe lock cache slots.

Figure 2:
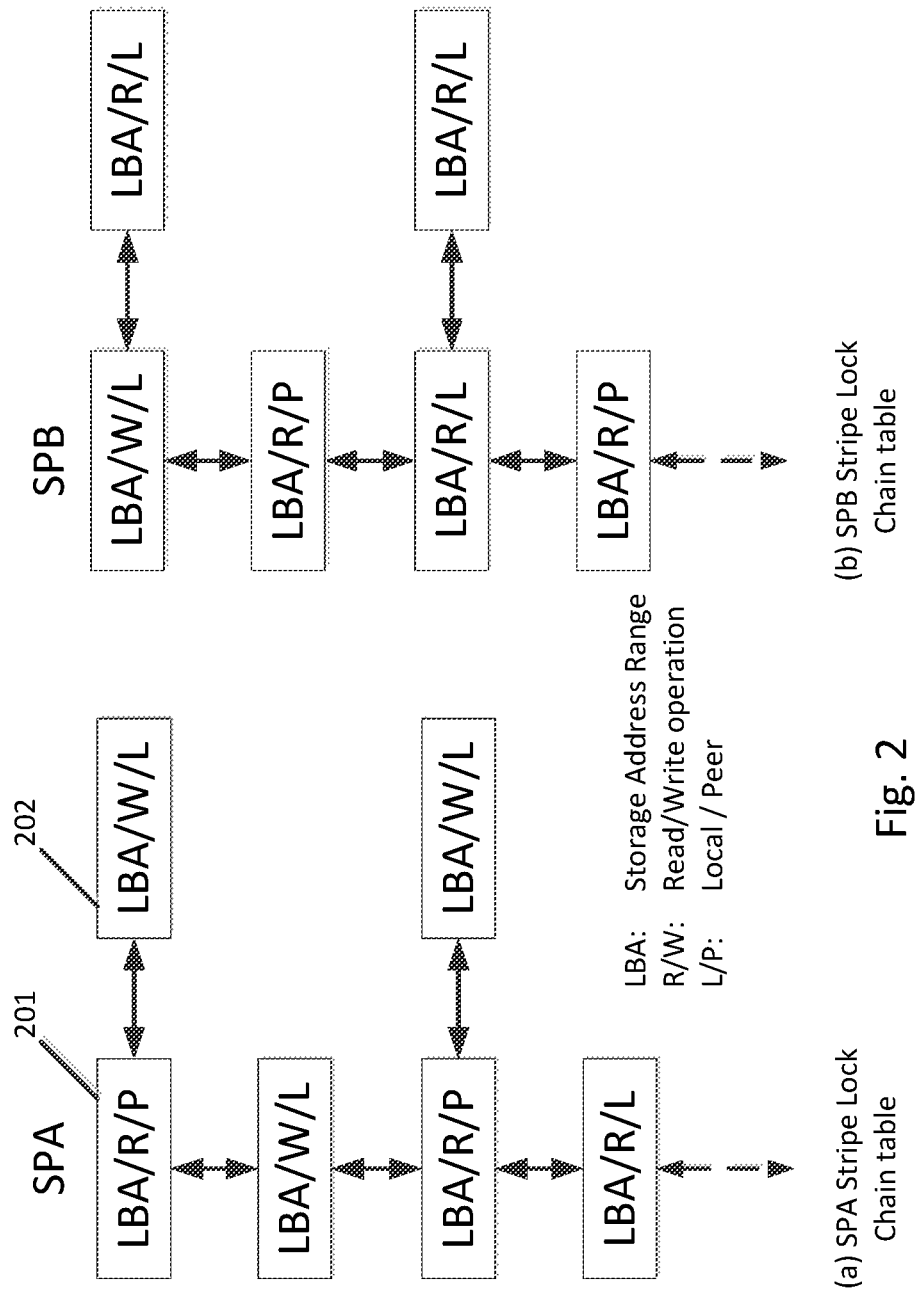
FIG. 2 shows an exemplary schematic diagram of a stripe lock chain table used in a dual SP storage device.

FIG. 2 shows an exemplary schematic diagram of a stripe lock chain table used in a dual SP storage device. As shown in the figure, the storage device comprises two SPs, i.e., SPA and SPB. Each SP stores a stripe lock chain table for each storage array group (e.g., RAID group), e.g., a SPA stripe lock chain table (referred to as a local stripe lock chain table of SPA) and the SPB stripe lock chain table (referred to as a local stripe lock chain table of SPB) as shown in FIG. 2(a) and FIG. 2(b), respectively. Each stripe lock chain table at least comprises a "permission chain," e.g., a longitudinal chain as shown in FIG. 2. The permission chain represents information regarding IO operation requests to a specific storage address range (e.g., the LBA range) of a storage array group that have already been permitted by the current local SP. Each longitudinal chain comprises a plurality of records, which is represented by a block in FIG. 2. Each record may for example comprise three fields {storage address range, operation, requesting side}. In FIG. 2, the "LBA range" indicates a storage address range. The LBA range field records a LBA range, to which the IO operation request that has been permitted by the local SP is directed; the operation field records a type of the IO operation request that has been permitted by the local SP, i.e. a write operation (W) or a read operation (R); and the requesting side field records whether the permitted IO operation request comes from the local SP or from a peer SP. For example, as shown in the first block in the longitudinal chain in FIG. 2(a), the three fields therein are "LBA/R/P," which means the local SP, i.e. SPA, has permitted a read operation request to the LBA range represented by the "LBA" from the peer SP.

In one embodiment, each stripe lock chain table may additionally contain one or more waiting chains. In a further embodiment, the one or more waiting chains may be represented as one or more transversal chains in FIG. 2. In a further embodiment, each record in the waiting chain represents an IO operation request that may not have been permitted by the local SP yet, and also may contain three fields {LBA range, operation, requesting side}. In a further embodiment, meaning of each field may be the same as mentioned above and thus will not be detailed herein.

As shown in a block in the transversal chain in FIG. 2(a), the three fields therein are "LBA/W/L," which indicates that the local SP, i.e. SPA, has not permitted a write operation request to the LBA range represented by the "LBA" from the SPA yet.

In one embodiment, when an SP receives a new IO operation request to a certain storage address range in a storage array group (the SP is referred to as the local SP hereinafter), a local SP may first query a stripe lock chain table stored for a storage array group. In a further embodiment, if a new IO operation request may not be in conflict with a permitted IO operation request, then a local SP may permit a new IO operation request and add a new record that may record information on the IO operation request to top of a permission chain in a stripe lock chain table. In an alternate embodiment, a local SP may not permit a new IO operation request but may add a corresponding record into a waiting chain corresponding to a storage address range to which an IO operation request may be directed. In an example embodiment, as shown in FIG. 2(a), when a new IO operation request may be directed to a write operation on some or all of the LBA range represented by the LBA in block 201 as requested by a peer SP, then it may be found by querying a SPA stripe lock chain table that currently, a read operation on an address range from a peer SP may have been permitted. In a further embodiment, a new write operation request may not be permitted. In a further embodiment, an SPA may add a new record into a waiting chain corresponding to a storage address range. As shown in FIG. 2(a), a new block 202 is added to the right side of the block 201.

Figure 3:
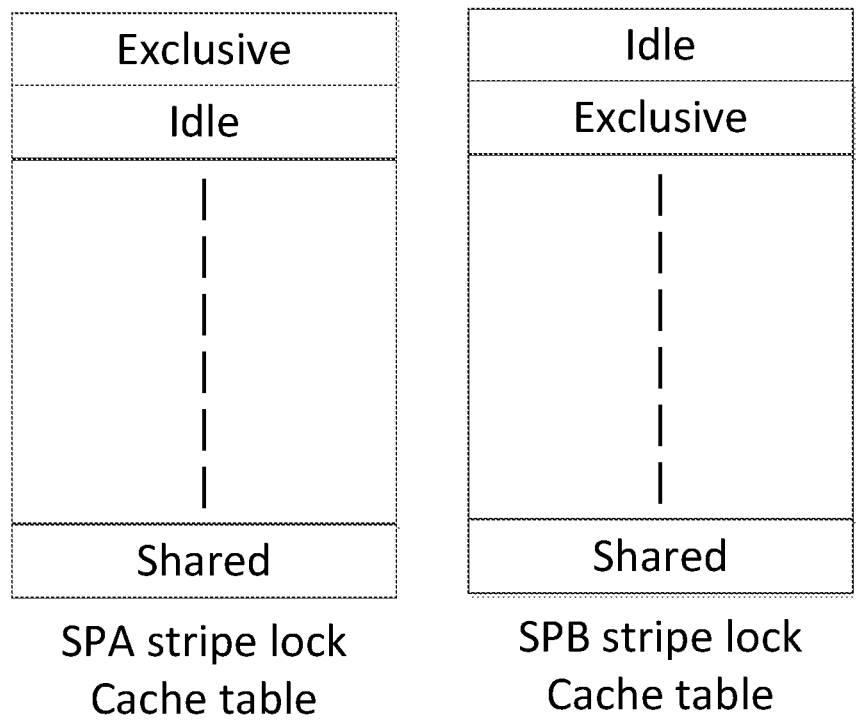
FIG. 3 shows an exemplary schematic diagram of a stripe lock cache table used in a dual SP storage device.

In a further embodiment, for an IO operation request that may have been permitted by a local SP, the local SP may further need to query a stored stripe lock cache table as shown in FIG. 3, before a requested IO operation may be executed.

FIG. 3 shows an exemplary schematic diagram of a stripe lock cache table used in a dual SP storage device. In continuation of the description of reference to FIG. 2, the storage device comprises two SPs, i.e. SPA and SPB. Each SP stores a stripe lock cache table for each storage array group, i.e. the SPA stripe lock cache table (referred to as the local stripe lock cache table of SPA) and the SPB stripe lock cache table (referred to as the local stripe lock cache table of SPB). Each stripe lock cache table includes a plurality of cache slots. Each cache slot corresponds to a specific storage address range of the storage array group. For example, if the capacity of one RAID group is 4 T, then each cache slot corresponds to a range of 4 T/512=8 G.

In one embodiment, each cache slot may record a peer SP's current permission state for a storage address range that may correspond to a cache slot. In a further embodiment, a permission state may include the following three types: exclusive, idle and shared.

In one embodiment, an "exclusive" state may mean that a peer SP may always allow read and write operations of a local SP on a storage address range corresponding to a cache slot. In a further embodiment, when a local SP may receive a new IO operation request, and if such a request may be found, after querying a stripe lock cache table, that a permission state indicated by the cache slot that may be corresponding to a storage address range to which the new IO request directed may be "exclusive," then a SP may not need to request permission for an IO operation from a peer SP.

In a further embodiment, an "idle" state may mean that any IO operation on a storage address range that may be corresponding to a cache slot may have to obtain permission from a peer SP.

In a further embodiment, a "shared" state may mean that a read operation request to a storage address range that may be corresponding to a cache slot may be executed as long as permission from a local SP may be obtained, without a need for obtaining permission from a peer SP. In a further embodiment, a write operation request to a storage address range that may be corresponding to a cache slot may have to obtain permission from both a local SP and a peer SP before execution.

In a further embodiment, for a same storage address range, if the permission state held by an SP may be in an "exclusive" state, then a permission state that may be held by the other SP may be in an "idle" state. In a further embodiment, if a permission state that may be held by an SP is a "shared" state, then the permission state that may be held by another SP may also "shared" state.

Figure 4:
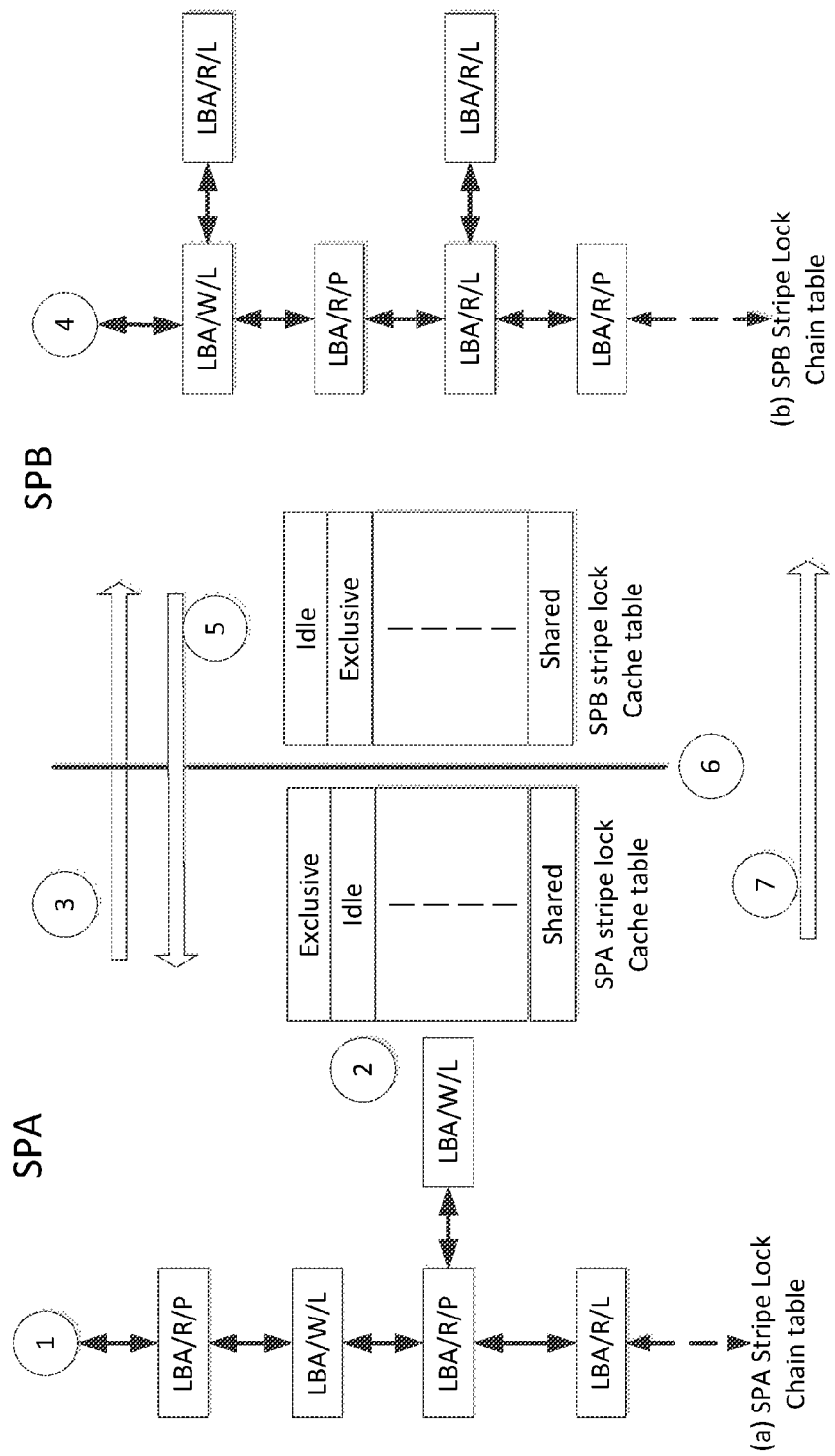
FIG. 4 shows an exemplary complete processing procedure for an IO operation request in a dual SP storage device.

FIG. 4 shows an exemplary complete processing procedure for an IO operation request in a dual SP storage device, wherein SPA and SPB are used to represent two SPs comprised in the storage device. In the figure, numbers in circles indicate sequences of the processing steps. The processing procedure starts at the SPA receiving an IO operation request.

Upon receiving a request, SPA first queries the stored SPA stripe lock chain table at step ①. If the query result at step ① indicates that the IO operation request conflicts with a permitted IO operation, then a record corresponding to the new IO operation request is added into the waiting chain in the stripe lock chain table, e.g. in the transversal chain as shown in FIG. 4, and then the processing procedure terminates.

If the query result at step ① indicates that the new IO operation request does not conflict with any permitted IO operation, then a record corresponding to the new IO operation request will be added to top of the permission chain (the longitudinal chain as shown in the figure) in the SPA stripe lock chain table, and then at step ②, SPA stripe lock cache table is queried.

If the query result at step ② indicates that the permission state of the peer SPB with respect to the storage address range, to which the new IO operation request is directed and is "exclusive" ("exclusive" state), it means that peer SPB always permits any IO operation from SPA on the storage address range, and then the new IO operation request may be permitted to be executed.

If the query result at step ② indicates that the permission state of peer SPB with respect to the storage address range, to which the new IO operation request is directed and is "idle" ("idle" state), it means any IO operation request from the local SPA to the storage address range needs to be permitted by peer SPB; and the processing procedure enters into step ③. Similarly, if the new IO operation request is a write operation request and the query result at step ② indicates that the permission state of peer SPB with respect to the storage address range to which the new IO operation request is directed and is "shared" ("shared" state), then the flow also enters into step ③.

At step ③, SPA sends a CMI message to SPB to request permission for the new IO operation request from SPB.

After receiving the CMI message, SPB queries SPB stripe lock chain table at step ④. If the query result at step ④ indicates that the new IO operation request conflicts with an IO operation that has already been permitted by SPB, then a record corresponding to the new IO operation request is added to the waiting chain in SPB stripe chain lock table (i.e., the transversal chain as shown in the figure), and then the processing procedure terminates.

If the query result at step ④ indicates that the new IO operation request does not conflict with any IO operation already permitted by SPB, then a record corresponding to the new IO operation request is added to the top of the permission chain of SPB stripe lock chain table, i.e. the top of the right longitudinal chain as shown in the figure. Then, at step ⑤, SPB sends a CMI message back to SPA to notify SPA that it permits the new IO operation request.

At step ⑥, after receiving the CMI message, SPA updates the permission state in the corresponding cache slot of SPA stripe lock cache table and starts executing the requested IO operation.

In an exemplary embodiment, if a new IO operation request may be a write operation request, then after the write operation request may be permitted to be executed, corresponding cache slot in SPA stripe lock cache table may be updated to "exclusive", and correspondingly peer SPB updates the state in the corresponding cache slot in SPB stripe lock cache table may be updated to "idle." In another exemplary embodiment, if a new IO operation request may be a read operation request, and the current state of the corresponding cache slot in the SPA stripe lock cache table may be "idle", then after the new IO operation request may be permitted to be executed, the state of the corresponding cache slot may be updated to "shared", and correspondingly the state of the corresponding cache slot in the stripe lock cache table of peer SPB may also be updated to "shared."

In one embodiment, a state update for a cache slot record may be associated with a change in the permission state of the whole storage address range corresponding to the cache slot. In a further embodiment, if SPA may require to update the state of a certain cache slot record in SPA stripe lock cache table, SPA may need to request permission from peer SPB with respect to a whole storage address range corresponding to a cache slot. In an example embodiment, if SPA may receive a write request only for a part of a whole address range that may be corresponding to a certain cache slot, but SPA may require to update a state of the cache slot to "exclusive", then SPA may request permission for a write operation on a whole storage address range corresponding to a cache slot from SPB so as to complete update of the cache slot.

Referring back to FIG. 4, after the requested IO operation may be completed, SPA may delete the corresponding record in SPA stripe lock chain table, i.e. deleting the corresponding block in the longitudinal chain as shown on the left side of FIG. 4, and meanwhile may send a CMI message to SPB at step ⑦ so as to notify SPB to delete the corresponding record in SPB stripe lock chain table. The operation at step ⑦ may also be immediately performed after step ⑤.

In order to illustrate the performance of the processing method as shown in FIG. 4, a simple model is provided in Table 1 below.

TABLE 1

| LBA | SPA state | SPB state | Total number of CMI messages |
|---|---|---|---|
| LBA1 | Exclusive | Idle | Read: 3N, Write: 3N |
| LBA2 | Shared | Shared | Read: 0; Write: 6N |
| LBA3 | Idle | Exclusive | Read: 3N, Write: 3N |

In this model, it is assumed that the state of the cache slot corresponding to the address range LBA1 in SPA SL cache table is "exclusive", and the state of the cache slot in the corresponding SPB SL cache table is "idle". If in SPA SL cache table, the state of the cache slot corresponding to the address range LBA2 is "shared", and the state of the cache slot in the corresponding SPB SL cache table is also "shared". If in SPA SL cache table, the state of the cache slot corresponding to the address range LBA3 is "idle", then the state of the cache slot in the corresponding SPB SL cache table is "exclusive". Moreover, SPA receives "N" new IO operation requests, and SPB also receives "N" new IO operation requests. Accordingly, the performance of the existing stripe lock processing method will be analyzed through the following scenarios:

1. If all of the new IO operation requests are read requests directed to LBA1, then for SPA, it does not need to send any CMI message, while for SPB, it needs to send three CMI messages for each read request, namely the first CMI message is used for requesting peer SPA's read permission, i.e. requesting to obtain a stripe lock; the second CMI message is used for granting permission from SPA to SPB, i.e. granting the stripe lock; and the third CMI message is used for SPB to notify SPA of releasing the obtained stripe lock. Therefore, 3N CMI messages in total need to be sent; and if all of the new IO operation requests are write requests directed to LBA1, then for SPA, it does not need to send any CMI message; while for SPB, it needs to send 3 CMI messages for each write request, namely the first CMI message is used for requesting peer SPA's write permission, i.e. requesting to obtain a stripe lock; the second CMI message is used for granting permission from SPA to SPB, i.e. granting the stripe lock; the third CMI message is used for SPB to notify SPA of releasing the obtained stripe lock. Therefore, 3N CMI messages in total need to be sent.

2. If all of the new IO operation requests are read requests directed to LBA2, then regardless of SPA or SPB, they needn't send any CMI message. if all of the new IO operation requests are write requests directed to LBA2, then regardless of SPA or SPB, for each write request, they need to send 3 CMI messages, namely the first CMI message is used for requesting peer SP's write permission; the second CMI message is used for granting the permission from peer SP; and the third CMI message is used for notifying peer SP of releasing the obtained stripe lock. Therefore, 6N CMI messages in total need to be sent.

3. If all of the new IO operation requests as received are requests directed to LBA3, then this scenario is similar to scenario 1, and will not be described in detail herein.

In one embodiment, from the above performance analysis it may be seen that in the existing stripe lock processing method, a storage address range corresponding to each stripe lock cache slot me be fixed and relatively large. In a further embodiment, a current stripe lock cache table may use a relatively coarse granularity. In a further embodiment, the coarse granularity may increase the odds of IO operation request collisions, and may thereby result in more frequent CMI transmission. In a further embodiment, such transmission over the CMI channel may lower processing speed of a storage device and may also deteriorates performance of a storage device.

In view of the above mentioned problems, various embodiments of the present disclosure propose an enhanced stripe lock processing solution. In one embodiment, an enhanced stripe lock processing solution may be implemented at least through dynamically generating a hierarchical stripe lock cache table during use of the storage device, and may thereby enable in solving at least some problems in the stripe lock processing method. In the following description, for the purpose of brevity, the stripe lock processing method steps and concept definitions identical to those in the above introduction will not be detailed.

Figure 5:
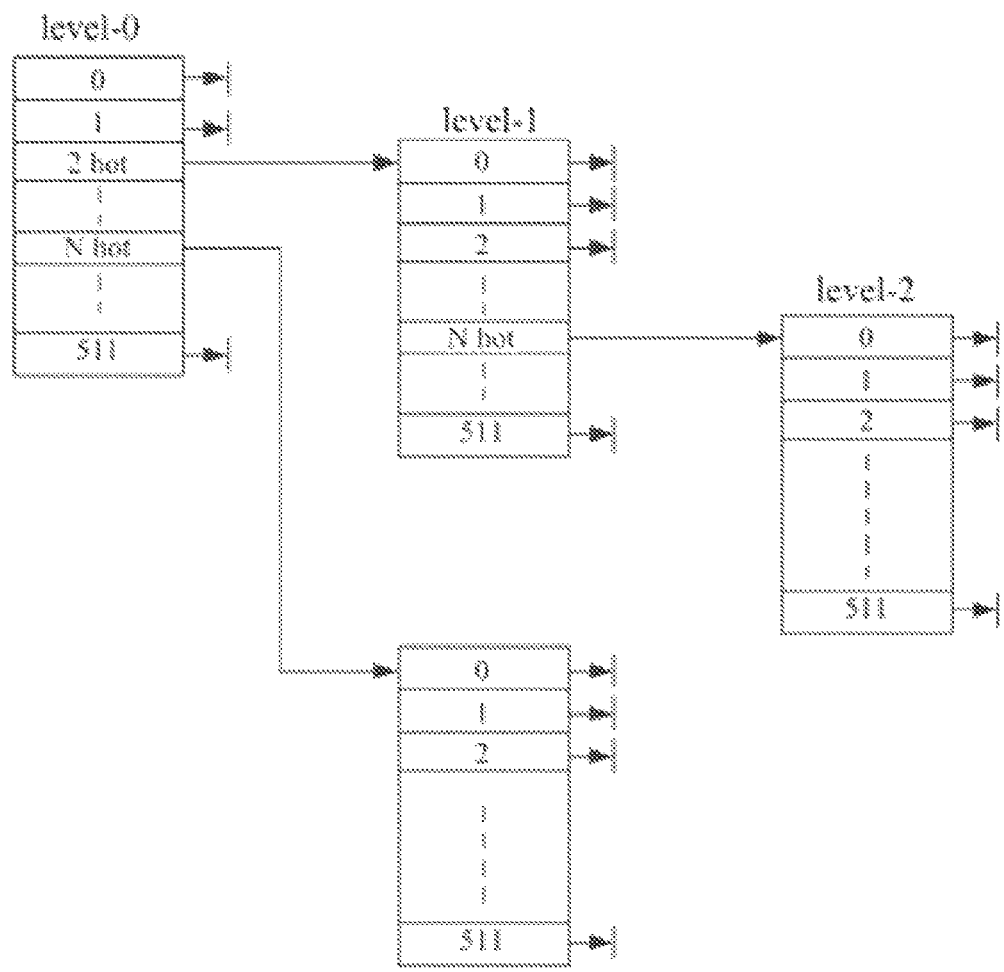
FIG. 5 shows an exemplary block diagram for illustrating a method for dynamically generating a hierarchical stripe lock cache table according to some embodiments of the present disclosure.

FIG. 5 shows an exemplary block diagram for illustrating a method for dynamically generating a hierarchical stripe lock cache table according to some embodiments of the present invention.

As shown in FIG. 5, when a storage device comprising dual SPs is initialized, each SP generates a separate stripe lock cache table (alternatively referred to as a "cache table") for each storage array group (e.g. RAID group) in the storage device, the cache table being called level-0 cache table that has a plurality of cache slots. Each cache slot corresponds to a specific storage address range (e.g. LBA range) in a storage array group or corresponds to a certain storage space size.

Subsequently, during use of the storage device, if a number of times of IO operation requests to a specific storage address range corresponding one or more certain cache slots of multiple cache slots in the level-0 cache table exceed a first predetermined threshold, then the one or more cache slots, for example, may be labelled as "hot" cache slots.

Subsequently, a new cache table is generated for each of the one or more "hot" cache slots. The newly generated cache table is called a level-1 cache table, and the cache slot from which the level-1 cache table is generated is called a parent cache slot of the level-1 cache table, and correspondingly the level-1 cache slot is called a child cache table of its parent cache slot. The level-1 cache table can be linked to its corresponding parent cache slot, e.g. via a pointer. For example, as shown in FIG. 5, the cache slot 2 in the level-0 cache table is linked to a level-1 cache table; then the cache slot 2 is a parent cache slot of the level-1 cache table to which it is linked; correspondingly the level-1 cache table is a child cache table of the cache slot 2. Each level-1 cache table at least consists of a plurality of cache slots. The size of the storage space corresponding to each cache slot in the level-1 cache table is a numerical value resulting from the size of the cache space corresponding to its corresponding parent cache slot divided by the number of cache slots in the level-1 cache table, which may be converted to a corresponding storage address range through a converting method (not detailed herein.) In a preferred embodiment, the number of cache slots in the level-1 cache table may be identical to the number of cache slots in a higher level, i.e. level-0 cache table.

Similarly, if during the subsequent use of the storage device, the number of times of IO operation requests to the storage address range corresponding to one or more certain cache slots of the multiple cache slots in the higher level, i.e. level-N-1, (e.g. level-1 as shown in FIG. 5) cache table exceed a second predetermined threshold, i.e. becoming "hot," then the one or more cache slots may be labelled as "hot" cache slots. Usually, the second predetermined threshold is less than the first predetermined threshold. A new cache table is generated for each "hot" cache slot of the one or more "hot" cache slots. The newly generated cache table is called level-N (e.g. level-2 as shown in FIG. 5) cache table, and the cache slot from which the level-N cache table is generated is the parent cache slot of the level-N cache table. The storage address range corresponding to the level-N cache table is identical to the storage address range corresponding to its parent cache slot. Likewise, the level-N cache table may be linked to its corresponding parent cache slot via a pointer.

In one embodiment, during use of a storage device, a multi-level cache chain table may be dynamically established, and respective levels, for example, may be linked through a pointer. In a further embodiment, by establishing a multi-level cache chain table, a cache table granularity may be effectively lowered, thereby reducing odds of IO operation collisions in consideration of the memory space that may be occupied by the cache table.

In one embodiment, a maximum number of cache table levels possibly included in a multi-level cache chain table may be limited by setting a maximum permitted memory space for the multi-level cache chain table to be established. In an example embodiment, if a memory space occupied by a current multi-level cache chain table may have reached the preset maximum value, then it may not be permitted to further generate any more child cache tables.

In an example embodiment, child cache tables may be directly generated for the cache slots becoming "hot" without being pre-labelled. In another example embodiment, other symbols or identifiers may be used to label the cache slots becoming "hot."

In one example embodiment, with the cache table as shown in FIG. 5, if a RAID group may have a size of 4T, and a cache chain table having a 3-level cache table may be established, each level of a cache table containing 512 cache slots, then a storage space size that may be corresponding to each cache slot in the level-0 cache table may be 8G, the storage space size that may be corresponding to each cache slot in the level-1 cache table may be 16M, and the storage space size that may be corresponding to each cache slot in the level-2 cache table may be 32K, and so on.

In one embodiment, it may be appreciated that there may be a certain restricting relationship between a parent cache slot (i.e. a cache slot having child cache tables linked thereto) and permission states recorded in respective cache slots in the corresponding child cache table. In an example embodiment, states recorded in a child cache tables may not only comprise "shared", but may also comprise "exclusive", then a state of the corresponding parent cache slot may be "shared" rather than "exclusive". In another example embodiment, states recorded in a child cache table may not only comprise "shared", but may also comprise "idle", then a state of the corresponding parent cache slot may be "idle" rather than "shared". In another example embodiment, a state of a parent cache slot may be "exclusive" only when all of the states recorded in the corresponding child cache table may be "exclusive".

In one embodiment, after a stripe lock chain table is established as mentioned above, at this point, if the local SP may receive an IO operation request and may need to query a local chain table after querying a local stripe lock table, then a query may start from level-0 cache table. In a further embodiment, if a state of one parent cache slot in the level-0 cache table indicates that the requested IO operation may be permitted, then a child cache table to which the cache slot may be linked needn't be queried any more. In a further embodiment, this may greatly enhance querying efficiency of a hierarchical cache chain table.

In one embodiment, if a state of a parent cache slot in a level-0 cache table may indicate that a requested IO operation may need to be permitted by a peer SP, then at this point a child cache table to which a parent cache slot is linked may be further queried. In a further embodiment, if a state of a cache slot that may be corresponding to a storage address range to which an IO operation request may be directed in the child cache table may indicate that a requested IO operation may be permitted. In an example embodiment, a state may be "exclusive", then the local SP may instruct directly starting execution of an IO operation without a need for sending a CMI to a peer SP for obtaining permission from peer SP. In a further embodiment, a number of CMI messages as transmitted may be greatly reduced.

In an alternate embodiment, if a cache slot include in the level-0 cache table may have a corresponding child cache table, then query for a cache slot may be directly skipped, so as to directly query a child cache table.

In one embodiment, when a number of IO operation requests to a storage address range that may be corresponding to a certain parent cache slot is significantly reduced, e.g. lower than a certain threshold, i.e. so-called becoming "cold", then still keeping a child cache table for a parent cache slot at this point may not bring more benefits. In a further embodiment, instead, it may unnecessarily occupy precious memory space, such that it may likely be impossible to generate necessary child cache tables for other cache slots that may be newly becoming "hot", resulting in a performance of a storage device that may not be enhanced as expected. In a further embodiment, when states of all cache slots in a child cache table may be identical, and a state of their parent cache slot may also identical, it may be unnecessary to perform a more refined query to a child cache table, because such a more refined query may not bring additional benefits compared with only querying a parent cache slot. In a further embodiment. it may increase the querying time and may lower the processing speed of an IO operation request, and meanwhile may unnecessarily occupy a memory space.

In view of the above, other embodiments according to the present disclosure provide a method of reclaiming a child cache table.

In some embodiments, when an SP finds that states recorded in a certain child cache table in the local stripe lock cache chain table may be all identical, the memory space occupied by all cache slots in the cache table may be reclaimed by combining all of the cache slots in the child cache table into its parent cache slot and deleting the child cache table.

In some other embodiments, when states recorded in the child cache table may be different from one another, but the number of times of IO operation requests to the storage address range that may be corresponding to the child cache table may be lower than a certain threshold during a given period of time, then memory space occupied by all cache slots in a child cache table may be reclaimed by changing all of the cache slots in a child cache table to a same state and combining them into a parent cache slot, and then deleting a child cache table.

Figure 6:
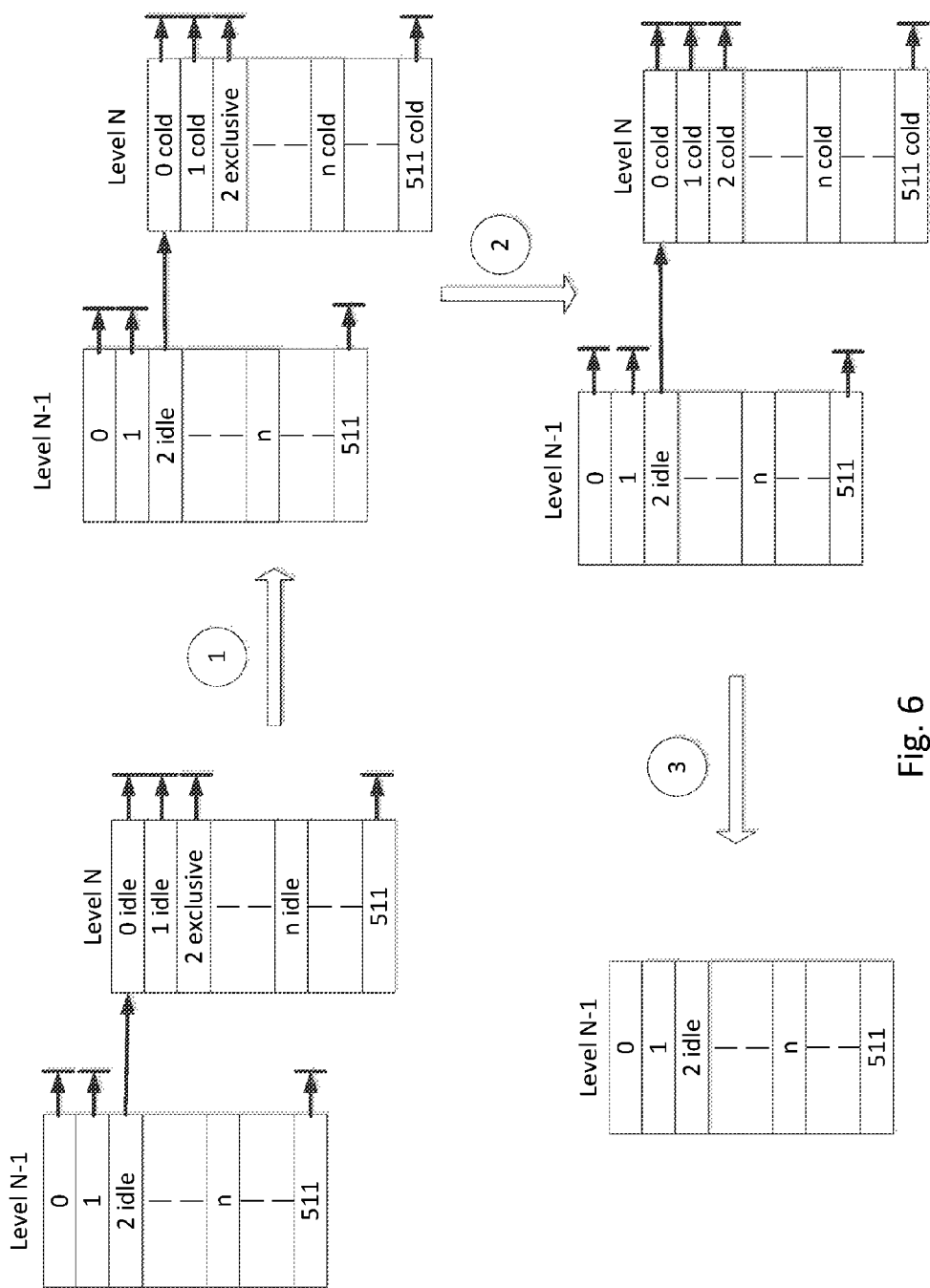
FIG. 6 shows an example of a method of reclaiming a child cache table when states recorded in the child cache table are different from each other according to some embodiments of the present disclosure.

FIG. 6 shows an example of a method of reclaiming a child cache table in a scenario where states recorded in the child cache table are different from one another according to some embodiments of the present disclosure.

As shown in the figure, at step ①, it is judged whether there is such a child cache table that corresponds to a storage address range for which the number of times of IO operation requests drops below a predetermined threshold.

At step ②, all cache slots recording the "idle" state in the child cache table are labelled as "cold".

In one embodiment it may be checked whether there is an uncompleted (incomplete) IO operation on the storage address corresponding to the cache slot that remains in the child cache table and May not labelled as "cold". In a further embodiment, in case of existence, wait, in a further embodiment, alternatively, a CMI message may be sent to a peer SP to request permission of changing a remaining cache slot corresponding to the local storage address on which no uncompleted IO operation may exist to the "idle" state, and may further label it as "cold".

In a further embodiment, if all cache slots in the child cache table may be labelled as "cold", then all cache slots in the child cache table may be combined into the parent cache slot; the cache table may be deleted; and then the memory space occupied thereby may be reclaimed.

In an example embodiment, a child cache table may be reclaimed by changing states of all cache slots in a child cache table to "shared". In a further example, other symbols or identifiers may be used to label the cache slots becoming "cold"; further, they even might not be labelled and directly combined and reclaimed.

In a further embodiment, by reclaiming those cache tables becoming cold or those unnecessary cache tables, unnecessary occupation of memory space may be reduced. In yet a further embodiment, unnecessary query of cache tables may also be reduced, thereby processing speed of the IO operations may be enhanced.

Figure 7:
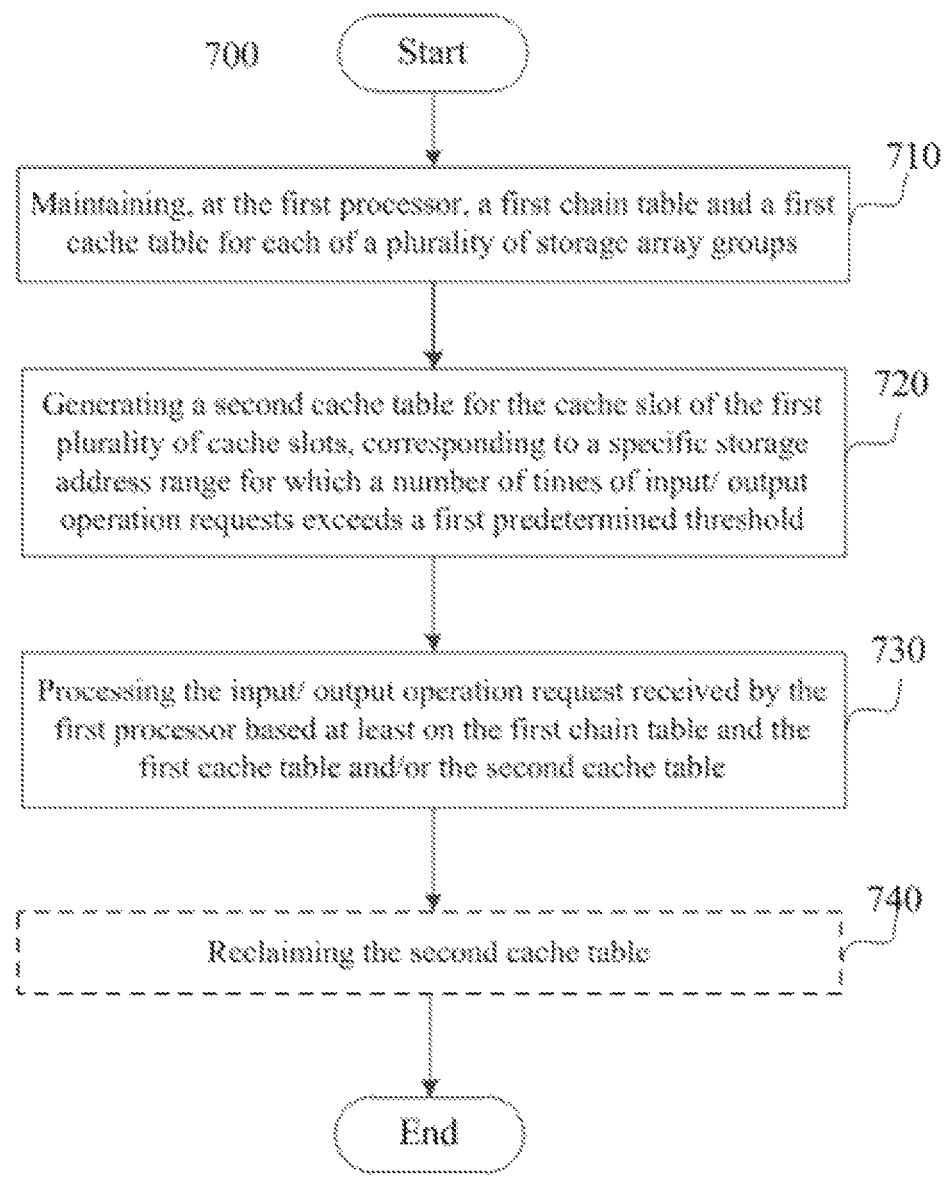
FIG. 7 shows an exemplary flowchart of a method 700 for processing an input/output operation request in a storage device according to an embodiment of the present disclosure.

FIG. 7 illustrates an exemplary flowchart of a method 700 for processing an input/output operation request in a storage device according to an embodiment of the present disclosure, the storage device including a first processor and a second processor and also including a plurality of storage array groups, e.g. RAID groups.

As shown in FIG. 7, in block 710, a first chain table and a first cache table are maintained at a first processor for each storage array group of the plurality of storage array groups.

In one example embodiment, the first chain table may be the stripe lock chain table as described with reference to FIG. 2. In a further embodiment, the chain table at least may hold information regarding an input/output operation request that may already have been permitted by a first processor with respect to a specific storage address range in a corresponding storage array group. In an example embodiment, a first cache table may be any level of cache table of a multi-level cache chain table as shown in FIG. 5. In a further embodiment, when a storage device may be initialized, the first cache table may be the initialized level-0 cache table.

In a further example embodiment, a first cache table may be a level-0 stripe lock cache table as described with reference to FIG. 5 that may include a first plurality of cache slots. In a further embodiment, each cache slot of the first plurality of cache slots may hold a permission state of a second processor with respect to an input/output operation on a specific storage address range in the corresponding storage array group.

Referring back to FIG. 7, in block 720, a second cache table is generated respectively for one or more of the following one or more cache slots of the first plurality of cache slots, where, a number of times of input/output operation requests to the specific storage address range corresponding to each of said one or more cache slots exceeds a first predetermined threshold. In one embodiment, a second cache table may include a second plurality of cache slots, and a size of each cache slot therein may be smaller than a size of each cache slot in a first plurality of cache slots. In a further embodiment, a storage address range corresponding to the second cache table may be identical to a storage address range that may be corresponding to a higher level cache slot for which a second cache table may be generated. In a further embodiment, a number of the second plurality of cache slots may be equal to that of the first plurality of cache slots. In one embodiment, a method for generating the second cache table has been described in detail with reference to FIG. 5.

Referring back to FIG. 7, in block 730, the input/output operation request received by the first processor is processed based at least on the first chain table and the first cache table and/or the second cache table. In one embodiment, this processing method may be similar to the above description with reference to FIG. 4, except that when querying a stripe lock cache table, it may be needed to query a multi-level cache chain table that may include the first cache table and the second cache table.

In one embodiment, the method 700 may further comprise reclaiming a second cache table in block 740.

In another embodiment, the reclaiming operation in the block 740 may, include, when the permission states held by the second plurality of cache slots in the second cache table are identical states, setting the cache slot, among the first plurality of cache slots, for which the second cache table is generated as the identical state and deleting the second cache table.

In a further embodiment, the reclaiming operation in block 740 may further comprise: first judging whether the number of times of the input/output operation requests to the storage address range corresponding to the second cache table may be lower than a second predetermined threshold; and if the number of times is lower than the second predetermined threshold, reclaiming the second cache table. The specific method for reclaiming the cache table has been described above in detail with reference to FIG. 6.

Figure 8:
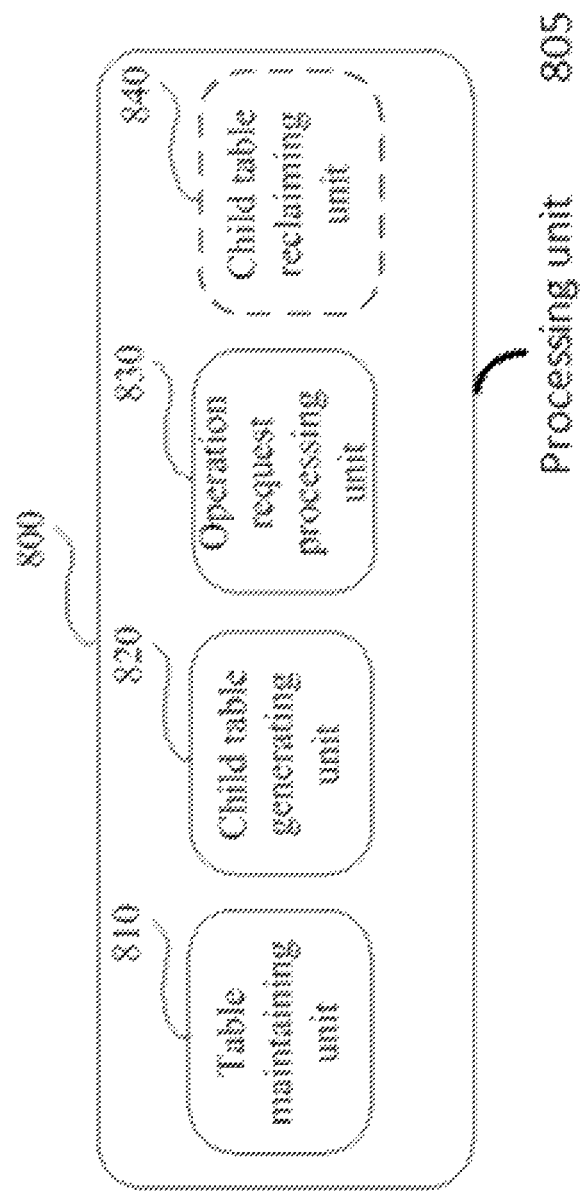
FIG. 8 shows an exemplary structural diagram of an apparatus 800 for processing an input/output operation request in a storage device according to an embodiment of the present disclosure.

FIG. 8 shows an example of a structural diagram of an apparatus 800 for processing an input/output operation request in a storage device according to an embodiment of the present disclosure, the storage device comprising a first processor and a second processor and also comprising a plurality of storage array groups, e.g. RAID groups.

As shown in FIG. 8, apparatus 800 comprises a table maintaining unit 810 configured to maintain, at the first processor, a first chain table and a first cache table for each of the plurality of storage array groups, wherein the first chain table at least holds information regarding an input/output operation request already permitted by the first processor with respect to a specific storage address range in a corresponding storage array group, and the first cache table comprises a first plurality of cache slots, each cache slot therein holding a permission state of the second processor with respect to an input/output operation on a specific storage address range in the corresponding storage array group. Specifically, the table maintaining unit 810 is configured to perform the operation in block 710 of the method 700.

Apparatus 800 further comprises a child table generating unit 820 configured to generate a second cache table respectively for one or more of the following one or more cache slots of the first plurality of cache slots: the number of times of input/output operation requests to the specific storage address range corresponding to each of said one or more cache slots exceeds a first predetermined threshold. In one embodiment, generated second cache table may include a second plurality of cache slots, a size of each cache slot therein being smaller than a size of each cache slot of the first plurality of cache slots. In a further embodiment, a storage address range that may be corresponding to the second cache table may be identical to the storage address range that may be corresponding to the preceding level cache slot for which the second cache table may be generated. In a further embodiment, a number of the second plurality of cache slots may be equal to that of the first plurality of cache slots. Specifically, the child table generating unit 820 is configured to perform the operation in the block 720 of the above method 700.

Referring to FIG. 8, apparatus 800 further comprises an operation request processing unit 830 configured to process the input/output operation request received by the first processor based at least on the first chain table and the first cache table and/or the second cache table. Specifically, the operation request processing unit 830 is configured to perform the operation in the block 730 of the above method 700.

In one embodiment, apparatus 800 may further comprise a child table reclaiming unit 840. In one embodiment, a child table reclaiming unit may be configured to, if the permission states held by a second plurality of cache slots in the second cache table may be identical states, then set the cache slot, among the first plurality of cache slots, for which the second cache table may be generated as the identical state and delete the second cache table. In an alternate embodiment, a child table reclaiming unit may be configured to first judge whether a number of times of the input/output operation requests to the storage address range that may be corresponding to the second cache table may be lower than a second predetermined threshold; and if the number of times may be lower than the second predetermined threshold, reclaim the second cache table. Specifically, the child table reclaiming unit 840 is configured to perform the operation in the block 740 of the above method 700.

In one embodiment, a single 805 processing unit can perform the functions of all sub unit table maintaining unit 810, child table generating unit 820, operation request processing unit 830 and child table reclaiming unit 840.

Those skilled in the art should understand that any structural diagram described here represents an illustrative diagram for implementing the principle of the present disclosure. Similarly, it should be understood that the flowchart described here represents various processes that may be specifically embodied in a machine readable medium and executed by a machine or a processing means, regardless of whether such machine or processing means is explicitly shown.

A person skilled in the art should also understand that various units in apparatus 800 according to the embodiments of the present disclosure may be implemented using various manners, comprising software, hardware, firmware or any combination thereof. For example, in some embodiments, apparatus 800 may be implemented using software and/or firmware. Alternatively or additionally, apparatus 800 may be partially or completely implemented based on hardware. For example, one or more units in the apparatus 800 may be implemented as an integrated circuit (IC) chip, an application-specific integrated circuit (ASIC), a system on chip (SOC), a field programmable gate array (FPGA), etc. The scope of the present disclosure is not limited in this aspect.

The present disclosure may be a system, method and/or computer program product. The computer program product may comprise a computer readable storage medium, on which computer readable program instructions enabling the processing apparatus/machine to implement various aspects of the present invention are embodied.

The above description with reference to the accompanying drawings is only exemplarily provided for illustrating the present disclosure. Those skilled in the art would appreciate that different structures can be provided based on the principle of the present disclosure as described above. Although these different structures are not explicitly described or illustrated here, they all embody the principle of the present disclosure and are included within the spirit and scope of the present disclosure. Besides, the examples mentioned here are explicitly mainly used for a teaching purpose so as to help readers understand the principle of the present disclosure and the idea contributed by the inventors to improve the present field, but should not be construed as limiting the scope of the present disclosure. Besides, all statements regarding the principle, aspects, and embodiments of the present disclosure, as well as their specific examples, are included in equivalents of the present disclosure.

What is claimed is:

1. A method for processing an input/output operation request in a storage device, the storage device comprising a first processor, a second processor, and a plurality of storage array groups, the method comprising:
    maintaining, at the first processor, a first chain table and a first cache table for each of a plurality of storage array groups,
    wherein each first chain table at least holds information regarding an input/output operation request that has been permitted by the first processor with respect to a specific storage address range in a corresponding storage array group, and each first cache table comprises a first plurality of cache slots, wherein each of the first plurality of cache slots holds a permission state of the second processor with respect to an input/output operation on a specific storage address range in the corresponding storage array group;
    in response to a number of times that input/output operation requests access to a particular storage address range exceeding a threshold, generating a second cache table for a cache slot of the first plurality of cache slots that corresponds to the particular storage address range wherein the second cache table comprises a second plurality of cache slots the second plurality of cache slots corresponding to the particular storage address range wherein each of the second plurality of cache slots holds a permission state of the second processor with respect to an input/output operation on a portion of the particular storage address range, wherein the portion of the particular address range is smaller than the particular storage address range;
    wherein the permission states comprise idle, shared, and exclusive; and
    processing the input/output operation request received by the first processor based at least on the first chain table and the first cache table and/or the second cache table.

2. The method according to claim 1, wherein:
    all of the cache slots in each first cache table correspond to a whole storage address range comprised by the corresponding storage array group.

3. The method according to claim 1, wherein generating the second cache table further comprises:
    labelling one or more cache slots, among the first plurality of cache slots, each corresponding to a specific storage address range for which a number of times of the input/output operation requests exceeds the first predetermined threshold; and
    generating the second cache table respectively for one or more of the labelled one or more cache slots.

4. The method according to claim 1, further comprising:
    if the permission states held by the second plurality of cache slots in the second cache table are identical states, setting the cache slot, among the first plurality of cache slots, for which the second cache table is generated as the identical state and deleting the second cache table.

5. The method according to claim 1, further comprising:
    judging whether the number of times an input/output operation requests access to a storage address range corresponding to the second cache table is lower than a second predetermined threshold; and
    if the number of times is lower than the second predetermined threshold, reclaiming the second cache table.

6. The method according to claim 5, wherein reclaiming the second cache table further comprises:
    labelling one or more cache slots, among the second plurality of cache slots, each corresponding to a specific storage address range for which the number of times of the input/output operation requests is lower than a third predetermined threshold;
    checking whether there is an uncompleted input/output operation on the specific storage address range corresponding to an unlabeled cache slot in the second plurality of cache slots;
    on determination that there are no uncompleted input/output operations, labelling the unlabeled cache slot in the second plurality of cache slots; and
    if all of the second plurality of cache slots are labelled, combining all the cache slots in the second cache table into the cache slot in the first cache table that corresponds to the particular storage address range, and deleting the second cache table.

7. The method according to claim 1, wherein the second cache table contains the same number of cache slots as each of the first plurality of cache tables.

8. The method according to claim 1, further comprising:
    setting a maximum memory space for each first cache table and the second cache table.

9. The method according to claim 1, wherein each first chain table further holds information regarding an input/output operation request that was not permitted by the first processor and was thus placed in a waiting chain.

10. A system, comprising:
    a storage device including a first processor, a second processor, and a plurality of storage array groups; and
    computer-executable logic operating in memory, wherein the computer-executable program logic is configured to process an input/output operation request in a storage device, wherein the computer-executable program logic is configured for the execution of:
    maintaining, at the first processor, a first chain table and a first cache table for each of a plurality of storage array groups, wherein each first chain table at least holds information regarding an input/output operation request that has been permitted by the first processor with respect to a specific storage address range in a corresponding storage array group, and first cache table comprises a first plurality of cache slots, wherein each of the first plurality of cache slots holds a permission state of the second processor with respect to an input/output operation on a specific storage address range in the corresponding storage array group;

in response to a number of times that input/output operation requests access to a particular storage address range exceeding a threshold, generating a second cache table for a cache slot of the first plurality of cache slots that corresponds to a particular storage address range wherein the second cache table comprises a second plurality of cache slots the second plurality of cache slots corresponding to the particular storage address range wherein each of the second plurality of cache slots holds a permission state of the second processor with respect to an input/output operation on a portion of the particular storage address range, wherein the portion of the particular address range is smaller than the particular storage address range;

wherein the permission states comprise idle, shared, and exclusive; and processing the input/output operation request received by the first processor based at least on the first chain table and the first cache table and/or the second cache table.

11. The system of claim 10, wherein all of the cache slots in each first cache table correspond to a whole storage address range comprised by the corresponding storage array group.

12. The system of claim 10, wherein generating the second cache table further comprises:

labelling one or more cache slots, among the first plurality of cache slots, each corresponding to a specific storage address range for which a number of times of the input/output operation requests exceeds the first predetermined threshold; and generating the second cache table respectively for one or more of the labelled one or more cache slots.

13. The system of claim 10, wherein the computer-executable program logic is further configured for the execution of:

if the permission states held by the second plurality of cache slots in the second cache table are identical states, setting the cache slot, among the first plurality of cache slots, for which the second cache table is generated as the identical state and deleting the second cache table.

14. The system of claim 10, wherein the computer-executable program logic is further configured for the execution of:

judging whether the number of times an input/output operation requests access to a storage address range corresponding to the second cache table is lower than a second predetermined threshold; and if the number of times is lower than the second predetermined threshold, reclaiming the second cache table.

15. The system of claim 14, wherein reclaiming the second cache table further comprises:

labelling one or more cache slots, among the second plurality of cache slots, each corresponding to a specific storage address range for which the number of times of the input/output operation requests is lower than a third predetermined threshold;

checking whether there is an uncompleted input/output operation on the specific storage address range corresponding to an unlabeled cache slot in the second plurality of cache slots;

on determination that there are no uncompleted input/output operations, labelling the unlabeled cache slot in the second plurality of cache slots; and if all of the second plurality of cache slots are labelled, combining all the cache slots in the second cache table into the cache slot in the first cache table that corresponds to the particular storage address range, and deleting the second cache table.

16. The system of claim 10, wherein the second cache table contains the same number of cache slots as each of the first plurality of cache tables.

17. A computer program product comprising a non-transitory computer readable medium encoded with computer executable program code, wherein the code enables execution across one or more processors for processing an input/output operation request in a storage device, the storage device comprising a first processor, a second processor, and a plurality of storage array groups, the method comprising:

maintaining, at each first processor, a first chain table and a first cache table for each of a plurality of storage array groups, wherein the first chain table at least holds information regarding an input/output operation request that has been permitted by the first processor with respect to a specific storage address range in a corresponding storage array group, and each first cache table comprises a first plurality of cache slots, wherein each of the first plurality of cache slots holds a permission state of the second processor with respect to an input/output operation on a specific storage address range in the corresponding storage array group, and all of the cache slots in the first cache table correspond to a whole storage address range comprised by the corresponding storage array group;

in response to a number of times that the input/output operation requests access to a particular storage address range exceeding a threshold, generating a second cache table for a cache slot of the first plurality of cache slots that corresponds to the particular storage address range, wherein the second cache table comprises a second plurality of cache slots, the second plurality of cache slots corresponding to the particular storage address range wherein each of the second plurality of cache slots holds a permission state of the second processor with respect to an input/output operation on a portion of the particular storage address range, wherein the portion of the particular address range is smaller than the particular storage address range, wherein generating the second cache table further comprises:

labelling one or more cache slots, among the first plurality of cache slots, each corresponding to a specific storage address range for which a number of times of the input/output operation requests exceeds the first predetermined threshold; and generating the second cache table respectively for one or more of the labelled one or more cache slots;

wherein each cache slot is enabled to indicate a permission state of the second processor, the permission states comprising idle, shared, and exclusive;

setting a maximum memory space for each first cache table and the second cache table, and processing the input/output operation request received by the first processor based at least on the first chain table and the first cache table and/or the second cache table.

18. The computer program product according to claim 17, further comprising:

if the permission states held by the second plurality of cache slots in the second cache table are identical states, setting the cache slot, among the first plurality of cache slots, for which the second cache table is generated as the identical state and deleting the second cache table.

19. The computer program product according to claim 17, further comprising:

judging whether the number of times an input/output operation requests access to a storage address range corresponding to the second cache table is lower than a second predetermined threshold; and if the number of times is lower than the second predetermined threshold, reclaiming the second cache table, wherein reclaiming the second cache table further comprises:

labelling one or more cache slots, among the second plurality of cache slots, each corresponding to a specific storage address range for which the number of times of the input/output operation requests is lower than a third predetermined threshold;

checking whether there is an uncompleted input/output operation on the specific storage address range corresponding to an unlabeled cache slot in the second plurality of cache slots;

on determination that there are no uncompleted input/output operations, labelling the unlabeled cache slot in the second plurality of cache slots; and if all of the second plurality of cache slots are labelled, combining all the cache slots in the second cache table into the cache slot in the first cache table that corresponds to the particular storage address range, and deleting the second cache table.

20. The computer program product according to claim 17, wherein the second cache table contains the same number of cache slots as each of the first plurality of cache tables, and wherein each first chain table further holds information regarding the input/output operation request that was not permitted by the first processor and was thus placed in a waiting chain.

* * * * *